United States Patent [19]

Nagai

[11] Patent Number: 4,511,023
[45] Date of Patent: Apr. 16, 1985

[54] CLUTCH BRAKE APPARATUS FOR FARM WORK MACHINERY OR OTHER APPARATUS

[75] Inventor: Shigeo Nagai, Nagano, Japan

[73] Assignee: Nisshin Kogyo Kabushiki Kaisha, Japan

[21] Appl. No.: 254,591

[22] Filed: Apr. 16, 1981

[30] Foreign Application Priority Data

| Apr. 28, 1980 | [JP] | Japan | 55-56827 |
| Apr. 28, 1980 | [JP] | Japan | 55-56828 |
| Apr. 28, 1980 | [JP] | Japan | 55-56829 |
| Apr. 28, 1980 | [JP] | Japan | 55-58750[U] |
| Apr. 30, 1980 | [JP] | Japan | 55-57668 |
| Apr. 30, 1980 | [JP] | Japan | 55-59592[U] |
| Apr. 30, 1980 | [JP] | Japan | 55-59593[U] |
| Apr. 30, 1980 | [JP] | Japan | 55-59594[U] |
| Apr. 30, 1980 | [JP] | Japan | 55-59595[U] |
| Apr. 30, 1980 | [JP] | Japan | 55-59596[U] |
| Apr. 30, 1980 | [JP] | Japan | 55-59597[U] |
| Sep. 24, 1980 | [JP] | Japan | 55-135609[U] |
| Sep. 26, 1980 | [JP] | Japan | 55-136863[U] |
| Sep. 26, 1980 | [JP] | Japan | 55-136864[U] |
| Sep. 26, 1980 | [JP] | Japan | 55-136865[U] |
| Sep. 30, 1980 | [JP] | Japan | 55-139471[U] |
| Sep. 30, 1980 | [JP] | Japan | 55-139472[U] |
| Sep. 30, 1980 | [JP] | Japan | 55-139473[U] |

[51] Int. Cl.³ .............................................. B60K 41/24
[52] U.S. Cl. ................................................. 192/18 R
[58] Field of Search ................ 192/18 R, 18 A, 12 R; 56/11.3, 11.7

[56] References Cited

U.S. PATENT DOCUMENTS

| 4,313,293 | 2/1982 | Nagai | 192/18 R |
| 4,320,822 | 3/1982 | Meldahl et al. | 192/18 R |
| 4,351,424 | 9/1982 | Lawrence et al. | 192/18 R |
| 4,352,266 | 10/1982 | Lloyd et al. | 192/18 R |

Primary Examiner—George H. Krizmanich
Attorney, Agent, or Firm—Cantor and Lessler

[57] ABSTRACT

A clutch brake arrangement for farm work machinery or other apparatus is provided comprising a rotating member rotatably mounted on an output shaft projecting from a member fixed to an engine mounting, a pressure plate disposed on said fixed member in such a manner that it is movable in the direction of the output shaft, a pressure spring for biasing the pressure plate toward said fixed member and urging the plate upon an operation rod, a clutch plate interposed between a disc plate rotatable integrally with said output shaft and said fixed member, and a clutch spring for biasing the clutch plate toward said disc plate, whereby the inner peripheral edge of said clutch plate is rotatably engaged with said pressure plate, the peripheral edge of said clutch plate is slidingly engaged in the direction of the output shaft of said rotating member, and said clutch plate is separated from said fixed member when said pressure plate is urged by said operation rod against said pressure spring, and is thereafter urged upon said disc plate. This arrangement may further include a sight window, a water discharge opening, a dust-proof member and the like for the purposes as described herein.

27 Claims, 18 Drawing Figures

CLUTCH BRAKE APPARATUS FOR FARM WORK MACHINERY OR OTHER APPARATUS

BACKGROUND OF THE INVENTION

The present invention relates to a clutch brake assembly for farm work machinery or other apparatus.

For example, when a power-operated lawn mower is to cut grass, it is necessary to stop the rotation of the blade while keeping the engine at an idle to save the labor involved in re-actuation of the engine and for safety's sake.

A clutch brake using a centrifugal clutch, a friction bolt and the like has heretofore been employed to carry out the above-mentioned operations. However, the clutch brake of this type has a complicated structure which inevitably renders the overall arrangement larger. In addition, an increased load is applied on the engine in converting it from an idle state to a state where engagement of the clutch takes place. Such an overload does not permit smooth engagement of clutch, and is apt to cause the engine to stop. Accordingly, it is still impossible to apply the clutch brake to an engine having a small capacity.

SUMMARY OF THE INVENTION

The present invention generally is directed to providing a solution to the above-mentioned problems.

An object of the present invention is to provide a clutch brake arrangement of small size and simple construction, in which a pressure plate, built in a member fixed to an engine mounting in such a manner that it is slidable in the direction of an output shaft, is urged by the rotation of an operation rod, and a clutch plate urged upon said fixed member by a pressure spring is urged upon a disc plate rotatable with the output shaft by a clutch spring via its neutral condition, so that the clutch plate is spaced away from the pressure plate to turn a rotating member, and in which, upon release of the operation rod, said clutch plate is spaced away from said disc plate, and is urged upon said fixed plate to brake the turning of said rotating member. With this arrangement, a load applied on an engine in converting it from an idle state to a state, where engagement of the clutch occurs, can be reduced as much as possible, thus assuring smooth engagement of the clutch with no danger of an engine stop and permitting sure braking upon removal of engagement of the clutch.

Another object of the present invention is to provide a clutch brake arrangement for farm work machinery or other apparatus which can reduce a load produced on an engine in converting it from an idle state to a state, where engagement of the clutch takes place, by slidingly supporting a pressure plate on a guide pin formed on a fixed member and urging the pressure plate with an operation rod provided with a bent portion, whereby parallel urging movement of the pressure plate is assured. According to this aspect of the present invention, the amount of rotation of the operation rod can be kept constant by providing diametrically on the pressure plate while passing it through the side wall of the fixed member, so that the pressure plate is urged with the bent portion of the operation rod, and mounting a stopper bolt on the pressure plate with its end facing the fixed member in such a manner that the amount of threaded extension thereof is regulated to restrict the strokes of the pressure plate. With this arrangement, it is possible to prevent a non-rotating member from taking abutment upon the disc plate during urging movement of the pressure plate, assure the minimum stroke necessary for engagement of the clutch, to thereby ensure the engagement of the clutch and keep a clutch lever in a constant position during engagement of the clutch.

A further object of the present invention is to provide a clutch brake arrangement for farm work machinery or other apparatus in which an operation rod is inserted via a reinforcing member through an opening having a diameter larger than that of the rod, and a stopper member is formed on the reinforcing member, said reinforcing member being in engagement with the fixed member. With this arrangement, assembling of the operation rod having a bent portion is made easy since the opening has a larger diameter. The reinforcing member affords an increased contact area for the rotation of the operation rod, leading to smooth and assured rotation of the operation rod. Even when the fixed member is broken off due to the movement of the operation rod, the rod suffers no adverse influence, thus resulting in improvement of the durability of the rod and assuring stable urging operation of the pressure plate over an extended period.

A still further object of the present invention is to provide a clutch brake arrangement for farm work machinery or other apparatus in which a clutch plate is engaged with a pressure plate with a bearing interposed therebetween, in such a manner that the rotational force of the clutch plate is not transmitted to the pressure plate. This arrangement is designed to reduce as much as possible the amount of the rotational force of the clutch plate transmitted to the fixed side of the pressure plate in engagement of the clutch, permit smooth engagement of the clutch with no fear of the engine stopping, assure a rapid braking operation upon removal of engagement of the clutch and be used with an engine having a small capacity. According to this aspect of the present invention, a tongue piece is formed in the bearing interposed between the clutch plate and the pressure plate. This piece is surely engaged with the peripheral edge of the clutch or pressure plate, whereby the bearing is surely engaged with the clutch or pressure plate. With this engagement, it is possible to prevent tilting of the bearing due to local wearing of a track formed by contact of the clutch or pressure plate with the bearing, prevent the bearing from running on the track and suffering damage, and prevent elimination of a gap between the bearing and the clutch or pressure plate during engagement of the clutch. This results in the amount of the rotational force of the clutch plate transmitted to the fixed side of the pressure plate being limited, thereby reducing the load on the engine as much as possible. In the present invention, the bearing may be an antifriction bearing of a synthetic resin material which substantially alleviates the degree of collision thereof with an associated member taking place in engagement or disengagement of the clutch. This causes that the associated member suffers no damage. Noises are substantially reduced without causing inconveniences such as entrance of water into the bearing and shortness of oil. Thus, the bearing can be used over a longer period of time, and can more readily be mounted.

A still further object of the present invention is to provide a small-sized clutch brake arrangement which is designed to reduce as much as possible a load applied on an engine in converting it from an idle state to a state, where engagement of the clutch takes place, and effect assured braking operation upon removal of the clutch with no possibility of an engine stop by disposing a clutch plate between a fixed member and a disc plate, inserting a support pin provided on a rotating member through an opening formed in the clutch plate with a clearance, and biasedly interposing a clutch spring between the clutch plate and a spring stopper formed on the end of the support pin, thereby absorbing vibrations applied on the rotating member. According to this aspect of the present invention, a plurality of pressure springs are biased between the pressure plate and the fixed member, and a plurality of clutch springs are biased between the clutch plate and the rotating member in such a manner that the clutch plate is biased toward the disc plate. The pressure springs are set to a resultant spring force such that, even when one of the pressure springs is broken, the resultant spring force of the remaining springs is greater than that of the clutch spring. In addition, even when one of the pressure springs becomes useless, engagement of the clutch can be effected.

A still further object of the present invention is to prevent unsatisfactory operation of a clutch plate which may be caused by entrance of foreign matters such as pieces of grass, mud, sand and the like into the arrangement during operation, and deposition and accumulation thereof in the clutch spring or in the vicinity thereof by providing spring stoppers on a support pin and the clutch plate in opposite relation thereto, disposing a clutch spring between the spring stoppers, and providing a dust cover for covering the clutch spring. This causes that engagement and disengagement of the clutch can always be effected smoothly and assuredly, with no generation of rust caused by deposition of such foreign matters onto the clutch spring, and the clutch spring can satisfactorily and stably be used over an extended period of time without suffering damage.

A still further object of the present invention is to prevent a rotating member from suffering damage and reduce as much as possible noises produced by collision thereof with a clutch plate by causing a guide member formed on the peripheral edge of the clutch plate to engage the rotating member in a recession-projecting fitting manner, so that it is slidable in the direction of an output shaft and the clutch plate is rotatable with the rotating member, thereby preventing the clutch plate from striking upon the rotating member in engagement of the clutch.

A still further object of the present invention is to provide a clutch brake arrangement for farm work machinery or other apparatus in which between a clutch plate and a rotating member is disposed a disc plate key-engaged with an output shaft, and an adjusting bolt is threaded into the disc plate with its ends taking abutment onto the end of the output shaft, so that the disc plate is movable by rotation of the adjusting bolt. With this arrangement, it is possible to regulate a gap between the disc plate and the clutch plate to a constant value by rotation of the adjusting bolt during assembling of the disc plate. Thus, smooth and stable engagement of the clutch is attained.

A still further object of the present invention is to provide a clutch brake arrangement for farm work machinery or other apparatus in which a sight window is formed in a rotating member in a position corresponding to both linings of a clutch plate. With this arrangement, it is possible to regulate the gap set between the disc plate and the linings of the clutch plate while viewing such regulation through the sight window. Accordingly, such regulation is effected surely and the wearing loss of the linings applied on both surfaces of the clutch plate is checked easily.

A still further object of the present invention is to provide an arrangement comprising a cylindrical collar member having at its intermediate portion a flange which is provided therein with a plurality of slit grooves extending from one end along the axial direction, a cylindrical key stopper fixed into said collar member, a disc plate sandwiched integrally between the flange of the key stopper and the flange portion of said collar member to convert said slit grooves into key grooves, said collar member being key-engaged with the output shaft leading successively to an engine while leaving at least one key groove as a discharge passage for oil etc. With this arrangement, it is easy, simple and inexpensive to form key grooves for key-engaging a disc plate with an output shaft leading to an engine. The remaining key groove is used as a discharge passage for oil etc. leaking from the engine, with the result that the oil is prevented from flowing onto the working plane of the disc plate, thus assuring engagement of the clutch.

A still further object of the present invention is to provide a clutch brake arrangement including a bearing cover having a flange for covering a bearing, which is fixed to a disc plate rotatable with an output shaft, and blades provided integrally on the flange of the bearing cover. This arrangement is designed to prevent entrance of foreign matters such as mud, sand, pieces of grass and the like into the bearing, said matters entering the arrangement during operation. Little or no difficulties are encounted in the operation of the rotating member, without applying an overload on an engine. Thus, the arrangement can be used over an extended period.

A still further object of the present invention is to provide a clutch brake arrangement including an opening provided around the peripheral edge of the end of a projection extending from a dish-like rotating member on which is provided a support pin for a clutch spring. With this arrangement, pieces of grass, mud, sand and the like entering thereinto are prevented from being deposited onto and built up in the inner corner of the projection of the rotating member to which a clutch spring is attached. This assures that the clutch plate does not come into contact with such foreign matters that cause unsatisfactory operation thereof. Entrance of such foreign matters through the opening is also restrained by a blast of air produced by the rotation of a cutting tool or the like, and such foreign matters invading through other portions are easily removed.

A still further object of the present invention is to provide a clutch brake arrangement for farm work machinery or other apparatus, including a water discharge through-opening provided in a position of the lowest portion of a fixed member which is spaced away from the surface thereof abutting upon a clutch plate toward the outer periphery. The purpose of this arrangement is to easily and assuredly discharge water stored in the interior of the fixed member from the outer periphery of the clutch plate to the outside, and to prevent insufficient operation of the clutch plate. Such insufficient operation is brought about by deposition of the water into the working plane of the clutch plate, said water being stored in the interior of the fixed member and leaking from the inner periphery of said member located on the side of the output shaft.

A still further object of the present invention is to provide a clutch brake arrangement, in which a cover has its outer and inner peripheral edges brought in close contact with the inner wall of a fixed member and a non-rotating member in the vicinity of an output shaft, and is screwed onto a guide pin, and in which the fixed member is tightly secured to an engine mounting while between the engine mounting and the fixed member is disposed a sleeve through which a clamp bolt passes. When the fixed member is screwed directly into the engine mounting, a gap is inevitably formed therebetween since the engine mounting is not in the form of a completely flat plate. Such a gap allows entrance of pieces of grass, mud, sand and the like, thereby causing insufficient operation of various parts. Such inconveniences are eliminated by a cover for covering the interior of the arrangement. This assures that engagement and disengagement of the clutch is always effected smoothly, and that various parts are prevented from rusting and can effectively be used over an extended period without suffering damage. Even when there is a difference in the overhang of an engine mounting for each machinery, a common fixed member can be mounted in place only by varying the length of the sleeve with no danger that the cover interferes with the overhang of the engine mounting. Thus, it is possible to use a common part for a variety of equipment. Further, due to the presence of the sleeve, it is unnecessary to mount the flange for fixing the fixed member on the overall periphery. The flange may be disposed only in the vicinity of the sleeve with substantial reductions in the weight of the overall arrangement.

BRIEF DESCRIPTION OF THE DRAWINGS

The above-mentioned and other objects of the present invention will become apparent from the following description with reference to the drawings: in which

FIGS. 1 to 3 are a sectional front view, a plan view and a bottom view of one embodiment of the present invention, respectively.

FIG. 4 is a partially cut-away side view of an operation rod mounted in place.

FIG. 5 is an exploded view of a collar member, a key stopper, an adjusting bolt, an output shaft and a key.

FIG. 6 is a perspective view showing another example of the key stopper.

FIG. 7 is a perspective view of a thrust bearing.

FIG. 8 is a front view, partially sectioned, showing one example of engagement of a rotating member with a clutch plate.

FIG. 9 is a plan view, partially cut-away, showing another embodiment of engagement of the rotating member with the clutch plate.

FIG. 10 is a sectional front view taken along the line A—A of FIG. 9.

FIG. 11 is a sectional front view showing a sight window applied thereover with a transparent cover.

FIGS. 12 to 15 are a sectional front view, a plan view and a bottom view of another embodiment of the present invention, respectively.

FIG. 16 is a front view of a bearing cover.

FIG. 17 is a sectional view taken along the line B—B of FIG. 16.

FIG. 18 is an elevational view of a portion of the embodiment of FIG. 14.

The present invention will now be explained with reference to FIGS. 1 to 11 which show the embodiment of the present invention incorporated into a power-operated lawn mower.

Figure 1:
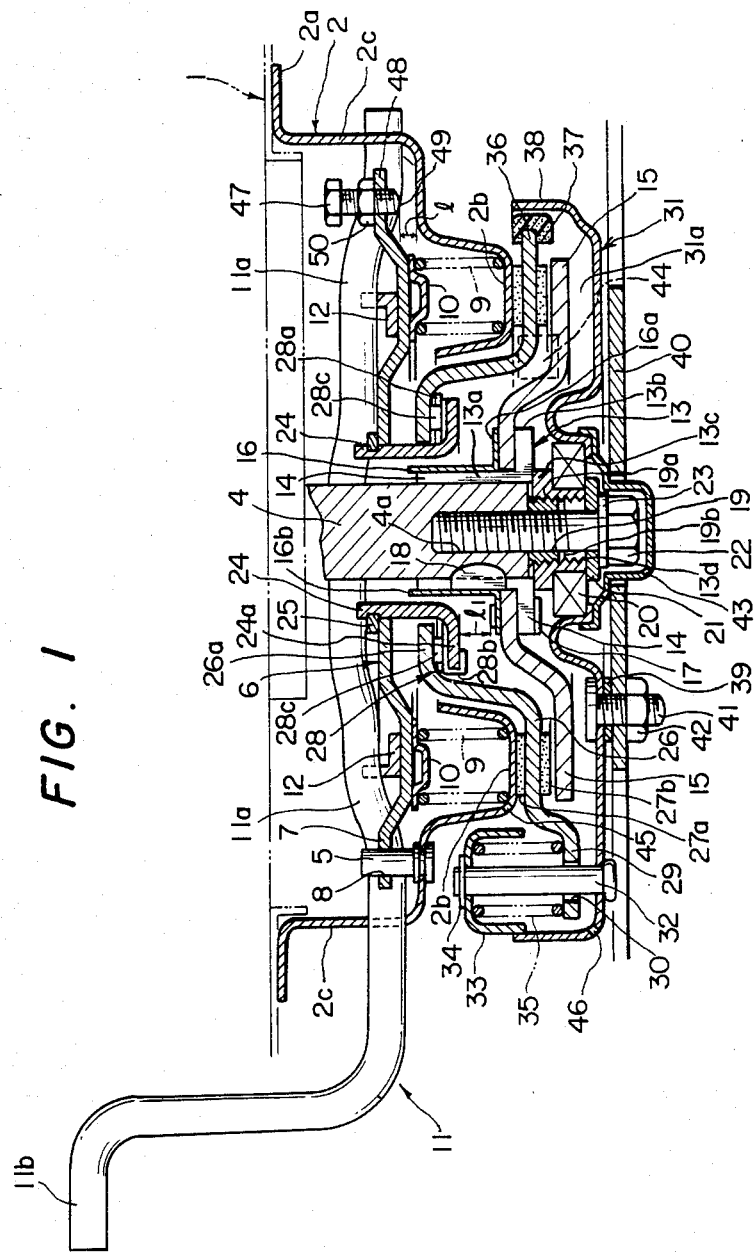
FIGS. 1 to 11 show one embodiment of the present invention applied to a power-operated lawn mower.

Referring to the drawings, particularly FIG. 1, an engine mounting generally shown at 1 is fixedly provided on its lower surface with a member 2 by inserting clamp bolts (not shown) through a plurality of openings formed in the flange 2a thereof. The fixed member 2 has an output shaft 4 extending from its center downward to a crank shaft (not illustrated) of an engine, and is vertically provided with three upward guide pins 5 at equal intervals. A pressure plate 6 is provided on its circumference with three outwardly projecting guide pieces 7 in positions corresponding to the pins 6. The pressure plate 5 is then housed in the fixed member 2 for vertical parallel movement by inserting the guide pins 5 through holes 8 formed in the pieces 7. Six pressure springs 9 are biasedly interposed between the pressure plate 6 and the fixed member 2 at regular intervals. Each of the springs 9 has its upper end abutting upon a spring retainer 10 fixed to the pressure plate 6 for location thereof, and its lower end abutting upon the inner bottom surface of an annular recession 2b in the fixed member 2, so that the pressure plate 6 is always urged under the spring forces on an operation rod 11 which passes through a side wall 2c of the fixed member 2 and is rotatably mounted on the plate 6 in the diametrical direction. The operation rod 11 is bent along the outer periphery of the output shaft 4 to form two bent portions 11a, which are permitted to abut upon urging members 12, 12 fixed to the pressure plate 6 to provide points on which the rod 11 is pivotable. Thus, the pressure plate 6 is guided by the pins 5 and moved downwardly in a parallel manner by pulling a cable (not shown) coupled to a clutch lever connected to an arm 11b of the rod 11.

A collar member generally shown at 13 comprises a first cylindrical portion 13a of a longer length, a flange portion 13b and a second cylindrical portion 13c of a smaller diameter and a shorter length. Two double-split grooves 14, 14 are provided from the first cylindrical portion 13a to the flange portion 13b. To the flange portion 13b forming part of the collar member 13 is integrally fixed a disc plate 15 by a rivet 17. More specifically, the disc plate 15 is integrally interposed between the flange 13a and a flange portion 16a of a cylindrical key stopper 16 fitted into the first cylindrical portion 13a. The key stopper 16 has its one end 16b projecting over the extremity of the first cylindrical portion 13a. The outsides of the split grooves 14, 14 in the first cylindrical portion 13a are closed up by the key stopper 16 fixed to the collar member 13, thereby forming key grooves. Consequently, the key grooves can be formed more easily at lower costs as compared with those obtained by cutting out the interior of the first cylindrical portion 13a.

The first cylindrical portion 13a forming part of the collar member 13 is fitted into the output shaft 4 with one of said key grooves receiving therein a semicircular key 18, whereby the disc plate 15 is rotatable integral with the output shaft 4. An adjusting bolt 19 having a male thread portion 19a on its overall cylindrical circumference is then threaded into an axial hole of the second cylindrical portion 13c having a female thread portion 13d. The amount of the collar member 13 to be fitted into the output shaft is regulated by this adjusting bolt 19. A washer 21 is placed on the lower end face of the second cylindrical portion 13c, said washer serving to hold the collar member 13 and a bearing 20 fitted over the second cylindrical portion 13c. A bolt 22 passes through the adjusting bolt 19 via a spring washer 23, and is screwed into a threaded hole 4a in the output shaft 4. This assures prevention of downward disengagement of the collar member 13 and the bearing 20. Portions of engine oil leaking out of the engine or blown off by rotation of the output shaft 4 are received by the end 16b of the key stopper 16, and guided into a discharge passage formed by one of the key grooves 14, into which is not fitted the semicircular key 18. These portions of engine oil are discharged downwardly through a discharge passage in the flange portion 13b of the collar member 13, said passage being joined to the first-mentioned passage, thus preventing them from flowing onto the working plane of the disc plate 15.

Figure 6:
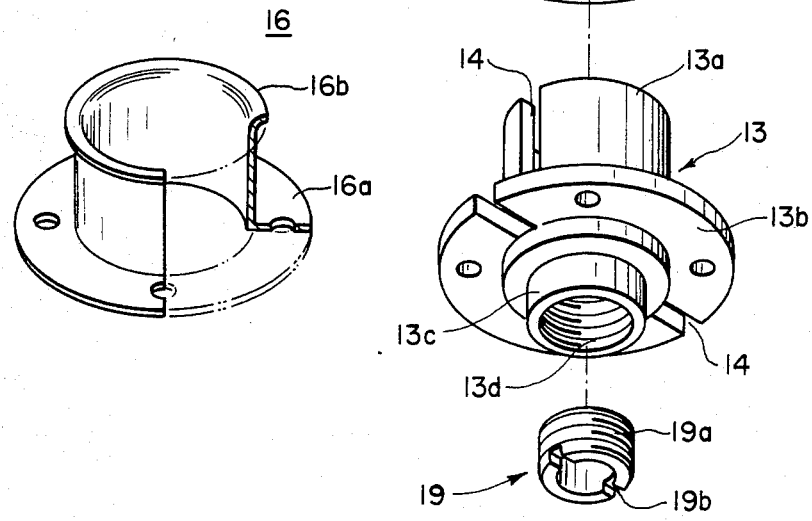
Figure 7:
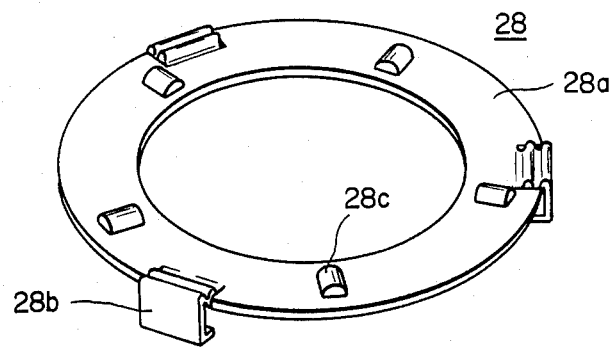
Figure 8:
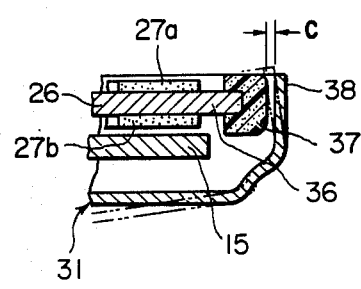

As shown in FIG. 6, the key stopper 16 may have the end 16b formed into a trumpet shape to more surely receive and guide descending portions of engine oil and the like. The number of the split grooves 14, 14 to be formed in the collar member 13 may be increased, if necessary.

A cylindrical retainer shown at 24 and having a flange portion 24a is suspended on the inner periphery of the pressure plate 6 by a snap ring 25. A clutch plate 26 is disposed between the disc plate 15 and the fixed member 2, and has annular linings 27a, 27b, fixedly applied to its sides. The inner periphery 26a of the clutch plate 26 abuts rotatably upon the flange 24a of the retainer 24 through a thrust bearing 28, whereby the rotational force of the clutch plate 26 generated by engagement of the clutch is not transmitted to the retainer 24.

A holder 28a for the thrust bearing 28 is provided at its outer edge with a plurality of tongue pieces 28b. Since these pieces 28b are folded along the outer periphery of the flange 24a of the retainer 24, the thrust bearing 28 moves following movement of the retainer 24. There is also no fear that local wearing may take place in a track formed as a result that bowls 28c come into contact with the retainer 24 or the clutch plate 26 over an extended period of time, thus causing tilting of the thrust bearing 28 or a failure of the bowls 24c, which may otherwise ride on the track. In addition, this assures that the clutch plate 26 is spaced away from the thrust bearing 28.

Alternatively, the inner edge of thrust bearing 28 may be formed with a plurality of tongue pieces 28b, which are bent along the inner periphery of the clutch plate 26 to hold the thrust bearing 28 by the clutch plate 26. In place of the thrust bearing 28, use may be made of any bearing having a low coefficient of friction, such as an antifriction bearing or a sliding bearing e.g., a bushing bearing. In farm working machinery in which the output shaft 4 is laterally arranged, a radial bearing is disposed between the inner periphery 26a of the clutch plate 26 and the retainer 24, by which retainer 24 is held.

Three supporting portions 29 extend outwardly over the peripheral edge of the clutch plate 26, and have therein openings 30 with a larger diameter, through which pins are insertable. A member 31 is rotatably mounted on the output shaft 4 through a bearing 20. A supporting pin 32 fixed to the rotating member 31 is inserted through each opening 30 with a clearance, and has its end passing through a cop-like spring stopper 33. Prevention of disengagement of the spring stopper 33 is achieved by a snap ring 34 fixed to the extreme end of the pin 32. Three clutch springs 35 are biasedly provided between the supporting portions 29 for the clutch plate 26 and the spring stopper 33, and serve to constantly bias the clutch plate 26 toward the rotating member 31. These clutch springs 35 are arranged at regular intervals. One of the clutch springs has a spring force equal to that of each pressure spring 9. The resultant spring force of a total of six pressure spring 9 is accordingly twice that of a total of three clutch springs 35.

Pivotal movement of the operation rod 11 causes the pressure plate 60 to be urged downward, so that the clutch plate 26 is urged toward the disc plate 15 under the resultant spring force of the clutch springs 35, with its lining 27b being closely urged on the disc plate 15. Upon release of the urging force of the operation rod 11 applied on the pressure plate 6, the pressure plate 6 is forced up by the pressure springs 9, with attendant elevation of the clutch plate 26 by the clutch springs 35. As a consequence, the lining 27a is closely urged on the fixed member 2 for braking. The braking force is then attained by subtracting the resultant spring force from that of the pressure spring 9. Even if two of the pressure spring 9 are broken or otherwise damaged, a sufficient braking force is assured for safe operation, since the resultant spring force of the remaining pressure springs 9 is still larger than that of the clutch spring 35. In such a case, the clutch plate 26 is guided by the supporting pins for movement.

Further, the peripheral edge of the rotating member 31 is held by the clutch spring 35 in such a manner that they can absorb the vibration of the output shaft 4 and an impact applied the rotating member 31. In this embodiment, vibrations are designed to be substantially uniformly absorbed into the three clutch springs 35 arranged at equal intervals.

Urging movement of the pressure plate 6 also causes the clutch plate 26 to be closely urged on the disc plate 15 rotating integrally with the output shaft 4 through its neutral condition by a preload exerted by the clutch spring 35. In this manner, no or little load is applied on the engine to assure engagement of the clutch. Since the clutch spring 35 has a dampening effect, vibrations produced from the output shaft 4 or impacts upon the blade or the like part are prevented from being transmitted to the clutch plate 26, thus assuring engagement of the clutch.

Three projections 36 are provided on the peripheral edge of the clutch plate 26 at regular intervals, and have guide members 37 made of glass-filled resin and the like. Three recessions 38 are equidistantly formed in the side wall of the rotating member 31 in correspondence with the projections 36 of the clutch plate 26. The guide member 37 of each projection 36 is then caused to abut, with a clearance c, upon one or both sides of the associated recession 38 for vertically slidable movement. This makes it possible for the rotating member 31 to turn integrally with the clutch plate 26. Even when during rotation, the member 31 vibrates while tilting vertically as shown by chain lines in FIG. 8, the vibrations of the rotating member 31 are never transmitted to the clutch plate 26 in the presence of a clearance between the end face of the guide member 37 and the inner wall of the recession 38. Relative vibrations of the clutch plate 26 and the rotating member 31 caused by rotation thereof are absorbed into the clutch spring 35. There is also no possibility that disengagement of each guide member 37 from the associated recession 38 takes place, since the end face thereof abuts on both sides upon the side wall of the rotating member 31.

Figure 9:
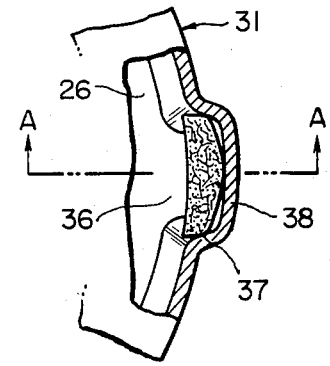
Figure 10:
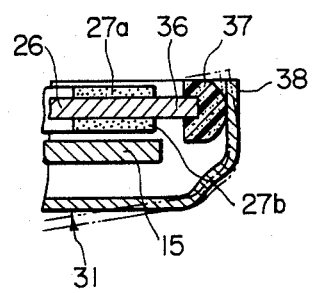

As shown in FIGS. 9 and 10, the end face of each guide member 37 may be formed into an arcuate shape. Even if such an arcuate face comes into contact with the inner wall of the associated recession 38, the vibrations of the rotating member 31 will not be transmitted to the clutch plate 26, as discussed in the foregoing. The end face of each guide member 37 then abuts upon the inner wall of the associated recession 38, so that no disengagement thereof from the projection 36 occurs. In this case, centering of the clutch plate 2 relative to the rotating member 31 is easily accomplished.

In addition, if the guide member 37 is formed of rigid resin, rigid rubber or the like, its abutment upon the rotating member 31 will be improved.

In the above-mentioned both embodiments, the guide member 37 is caused to project over the peripheral edge of the clutch plate 26, and the associated recession 38 is formed in the rotating member 31. However, this relation may be reversed to achieve a similar projection-recession engagement.

With the arrangement as explained above, the clutch plate 26 is prevented from striking against the rotating member 31 in engagement of the clutch with no possibility that the rotating member is damaged. Noise generated by collision of the clutch plate 26 with the rotating member is also reduced as much as possible. The clearance which the guide members 37 are given relative to the rotating member 31 and/or the arcuate end faces of the guide members 31 assures that the rotating member 31 does not come into contact with the clutch plate 26, even when the rotating member 31 vibrates while tilting in the direction of the output shaft during its rotation. In addition, since the rotating member vibrates on the arcuate end faces of the guide members 37 serving as supporting points, no vibration is transmitted to the clutch plate 26, so that no load larger than necessary is applied on the engine, thus assuring engagement of the clutch plate 26 with the disc plate 15 and preventing failures of the internal mechanism. If the guide members 37 are formed of hard resin rubber or the like, the rotatio member 31 strikes more gently against said member with substantial reduction or elimination of a noise.

The rotating member 31 is provided on the outside of its bottom with a blade 40 through a spacer 39 by threadedly connecting a nut 42 tightly with a bolt 41 inserted from the interior of the rotating member 31 through the base thereof. Reference numeral 43 is a dust cover attached to the rotating member 31.

A clutch gap between the clutch plate 26 and the disc plate 15 can be kept constant by turning a tool fitted into a groove 19b in the head of the adjusting bolt 19 during assembling of the collar member 13 so as to cause movement thereof with attendant movement of the disc plate 15. The clutch gap can be regulated precisely by reducing the lead and pitch of a male-threaded portion 19a formed on the adjusting bolt 19. During assembly, a clamping force of the bolt 22 is transmitted from the washer 21 to the second cylindrical portion 13c of the collar member 13 through the bearing 20, so that the internally threaded portion 13d of the second cylindrical portion 13c is brought into close contact with the externally threaded portion 19a of the adjusting bolt 19, resulting in assured fixation of the collar member 13.

A sight window 44 is formed in the side wall 31a of the rotating member 31, and positioned in correspondence with both linings 27a and 27b of the clutch plate 26. In assembling the collar member 13 to the output shaft 4, the adjusting bolt 19 is turned by a tool fitted into the groove in the head thereof while viewing the gap between the clutch plate 26 and the disc plate 15 through the sight window 44, to thereby cause movement of the collar member 13 with attendant movement of the disc plate 15. Thus, the gap can be regulated to a constant value.

This sight window 44 helps the monitoring of the wearing loss of the linings 27a and 27b of the clutch plate 26.

Figure 11:
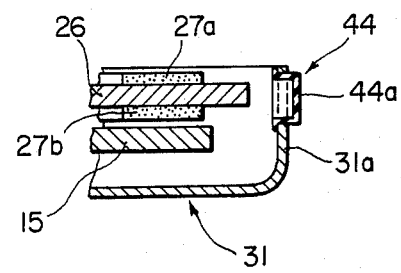
Figure 12:
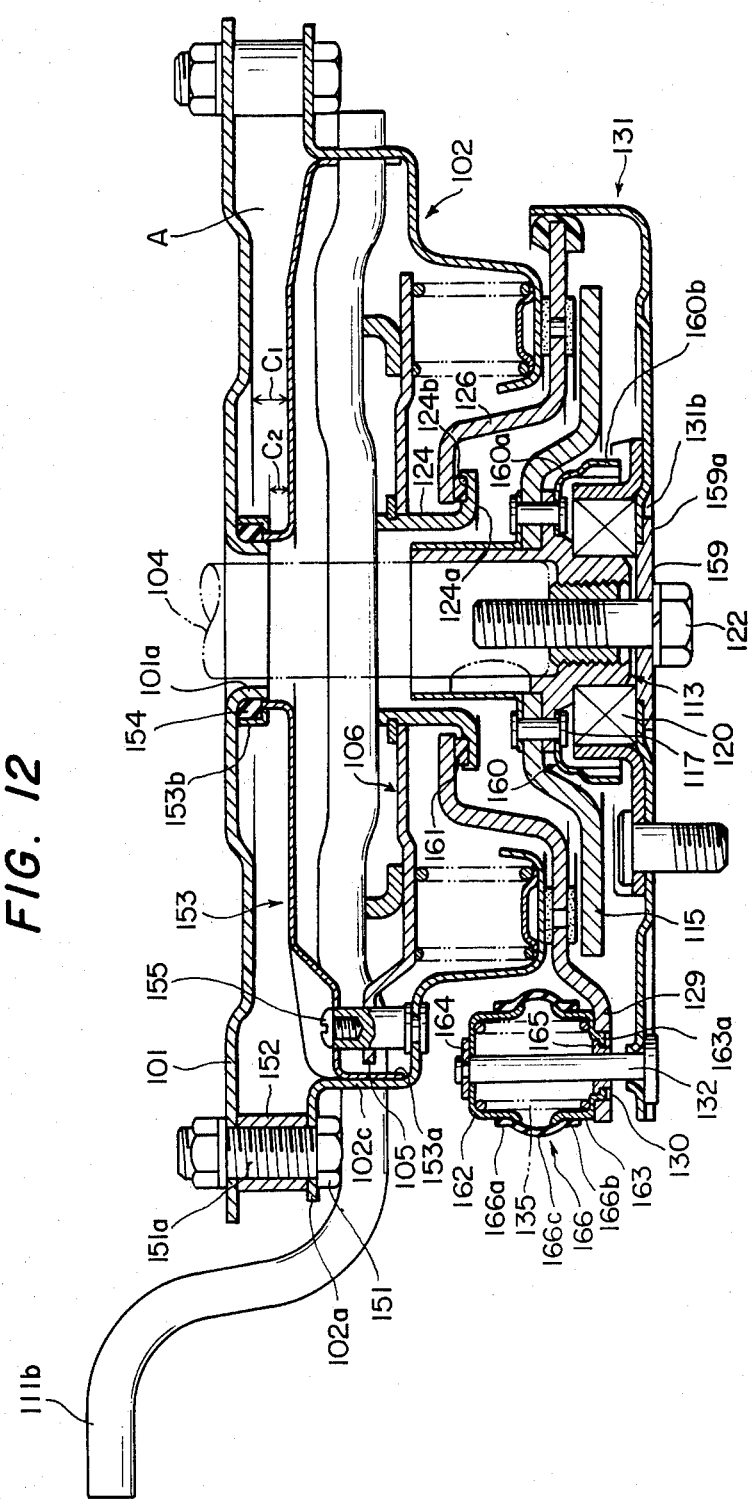
FIGS. 12 to 18 show another embodiment of the present invention applied to a power-operated lawn mower.
Figure 13:
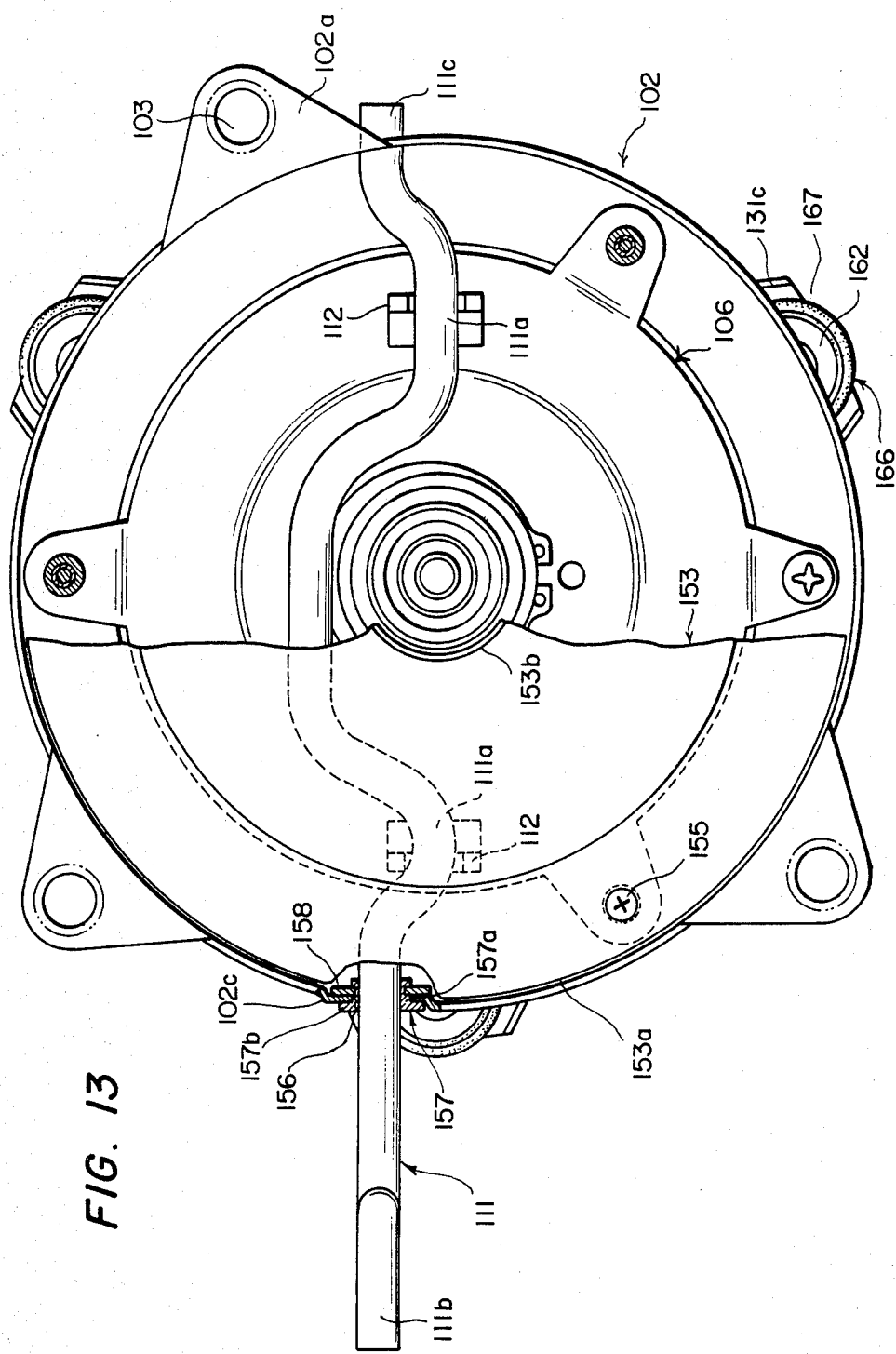
Figure 14:
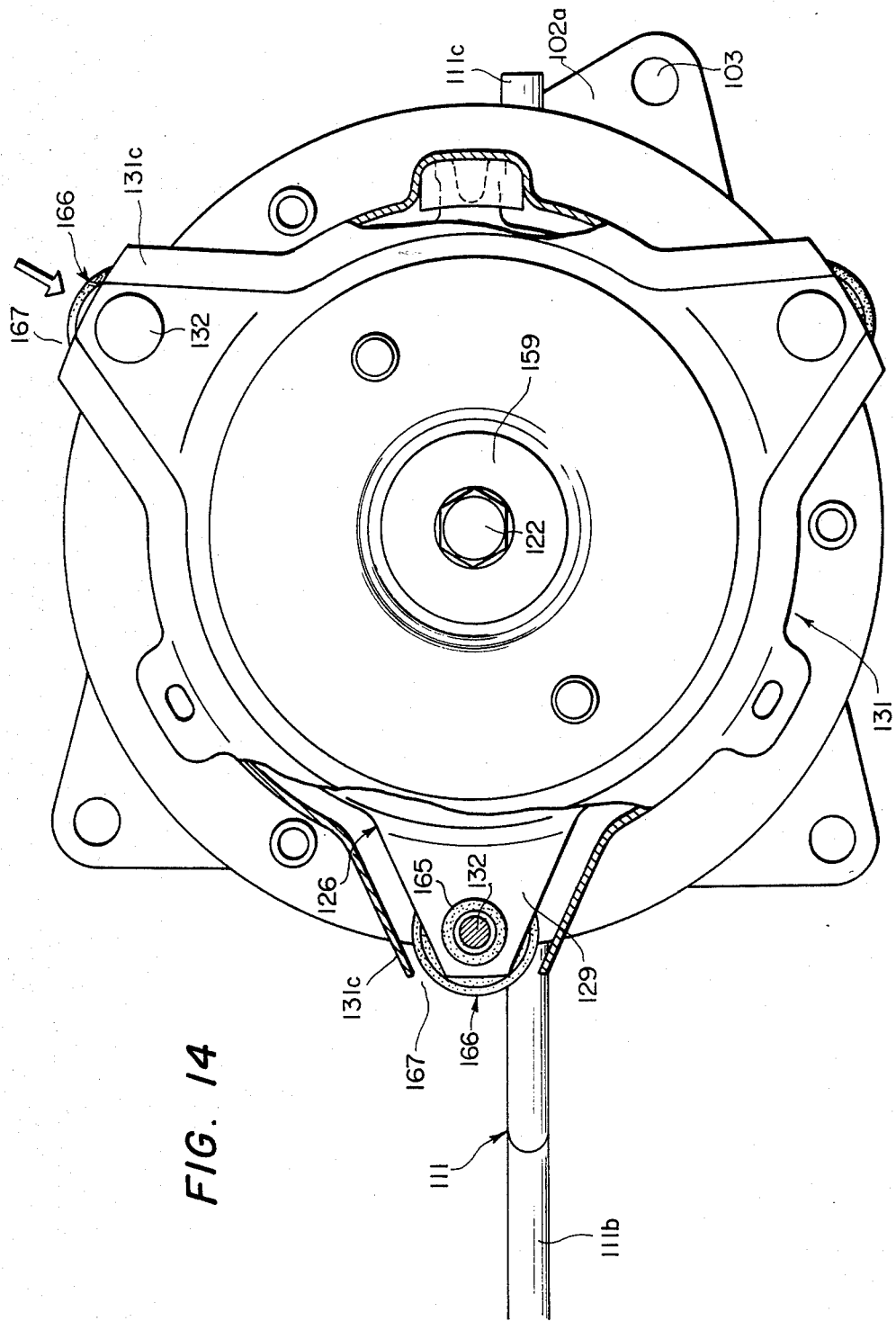
Figure 15:
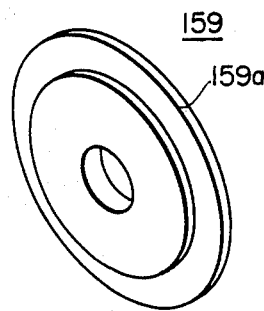
Figure 16:
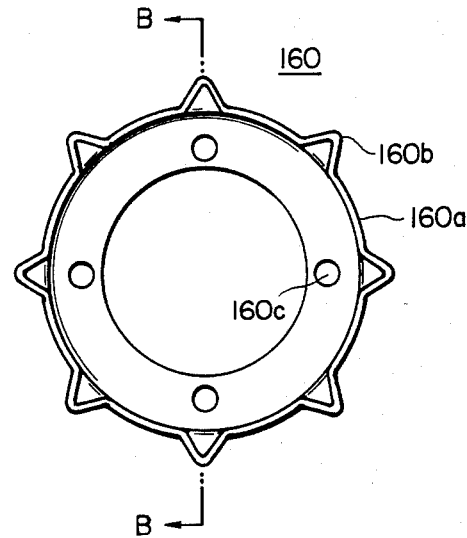
Figure 17:
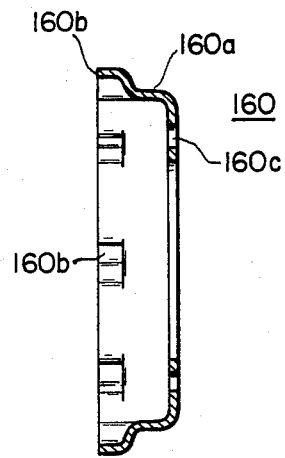
Figure 18:
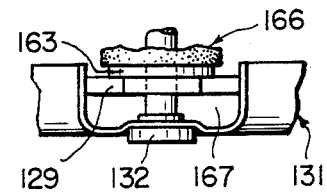

As shown in FIG. 11, the sight window 44 may be fitted with a transparent cover 44a to prevent dust, earth and sand, water etc. from entering the interior of the arrangement.

A water discharge port 45 is formed in the fixed member 2, and located in the lowest portion of the annular recession 2b and in a position spaced away from the surface of the clutch plate 26 abutting upon the lining 27a. Water, which enters into the fixed member 2, falls within the rotation member 31 through the port 45. Consequently, water entering from the outside of the arrangement into the inside is easily and surely discharged without causing it to be deposited upon the working plane of the clutch plate 26, resulting effective prevention of unsatisfactory or unstable braking operation. Such failures may be caused by a portion of water stored in the fixed member 2 or leaching from the side of the inner output shaft. In the former case the water corrodes the member 2 with resulting decreases in the strength, and in the latter case it is deposited on the working plane of the clutch plate 26.

A small slot 46 is formed in the bottom face of the end of each supporting portion 29 for the rotating member 31. Water and engine oil reaching the interior of the rotating member 31 are collected on the outside thereof by its centrifugal force, and then discharged from such slots 46.

A stopper bolt 47 for restricting the strokes of the pressure plate 6 is screwed, from above, into a threaded portion 49 in a piece 48 projecting over both edges of the pressure plate 6 extending at a right angle 11 with the operation rod 11, and restrained from rotation by a stopper bolt 47. A spacer l between the lower end of the stopper bolt 47 and the fixed member 2 restricts the amount of rotation of the operation rod 11, and is made smaller in width than the flange 24a of the retainer 24 and the rivet 17 holding the collar member 13 in place, allowing for the wearing loss of the lining 27a facing the fixing member 2. Pulling a cable then causes turning of the pressure rod 11, so that the pressure plate 6 is urged downwardly. The lining 27b of the clutch plate 26 is, in turn, urged upon the disc plate 15 by the clutch spring 35 for engagement of the clutch. In this case, the stopper bolt 47 always contact its lower end upon the fixed member 2, so that the amount of withdrawal of the cable is restricted to such an extent that the retainer 24 is spaced away from the rivet 17, since $l_1 > l$.

The stopper bolt 47, which the fixed member 2 and restricts the strokes of the pressure bolt 6, keeps the amount of retraction of the clutch lever constant. Urging movement of the pressure plate 6 also permits the flange 24a of the retainer 24, moving in the direction of the output shaft, to be prevented from contacting the rivet 17 by which the disc plate 15 is attached to the collar member 13. This assures that the collar member 13 is protected from damage and the minimum stroke required for engagement of the clutch is attained. Further, when actuating the clutch lever, engagement of the clutch is assured, and the clutch lever can be maintained in a constant position during engagement of the clutch. Furthermore, the stopper bolt 47 placed in a position extending perpendicularly to the operation rod 11 assures that, after the bolt abuts at the lower end upon the fixed member, it receives uniformly the urging forces from the operation rod 11, so that the parallelism of the pressure plate 6 is maintained.

The foregoing embodiment operates as follows:

In a braking condition as illustrated, wherein the pressure spring 9 is expanded, the clutch plate 26 is pulled up through the thrust bearing 28 by the retainer 24 suspended on the pressure plate 6, whereby the lining 27a is urged upon the undersurface of the bottom of the annular recession 2b. On the other hand, the clutch spring 35 is contracted so that the lining 27b of the clutch plate 26 is spaced away from the disc plate 15 without contacting it. Even when the engine is being driven, therefore, the output shaft 4 and the disc plate 15 are kept at an idle so that any rotational force is not transmitted to the rotating member 31, thus keeping the engine at an idle while keeping the blade stationary.

Figure 2:
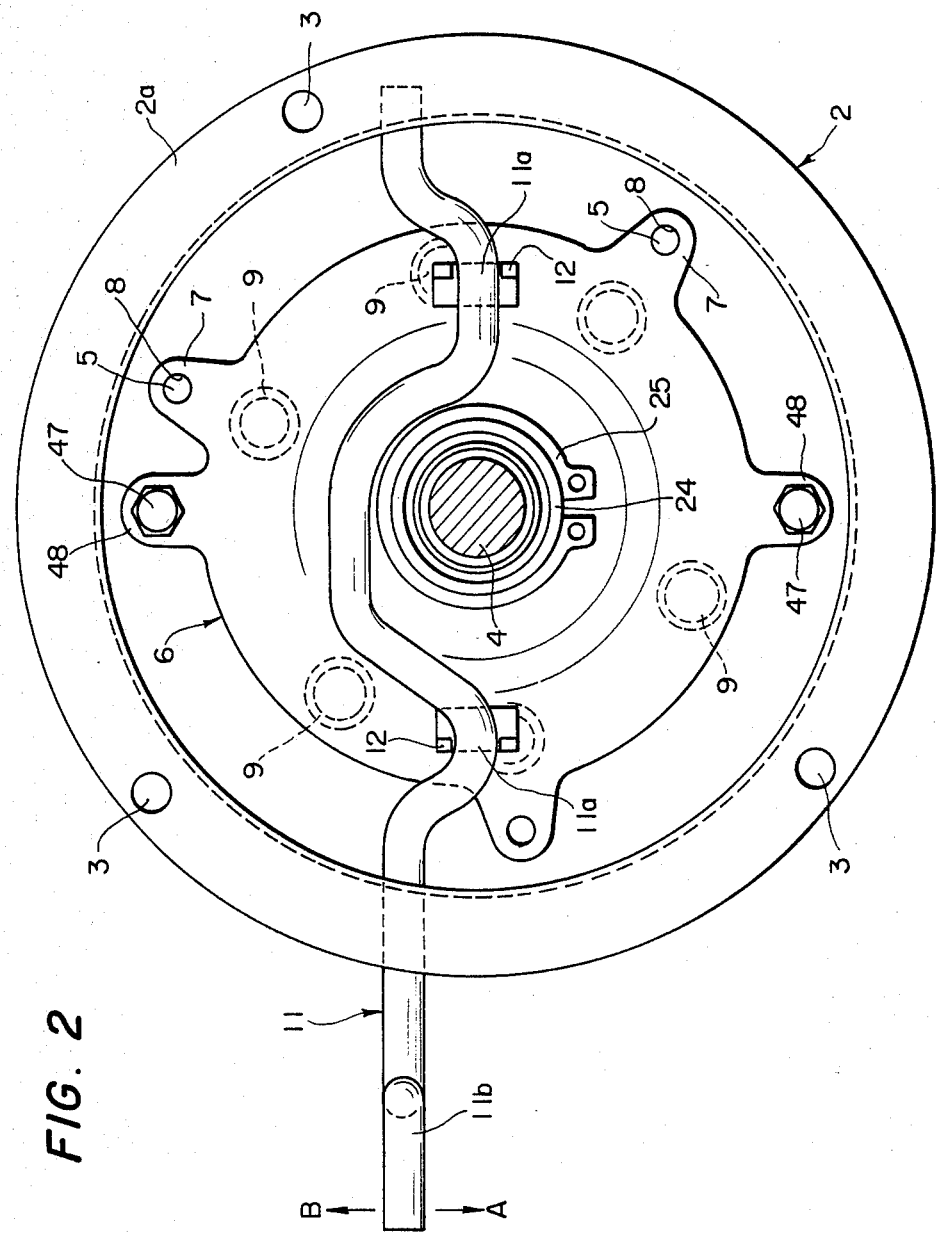
Figure 3:
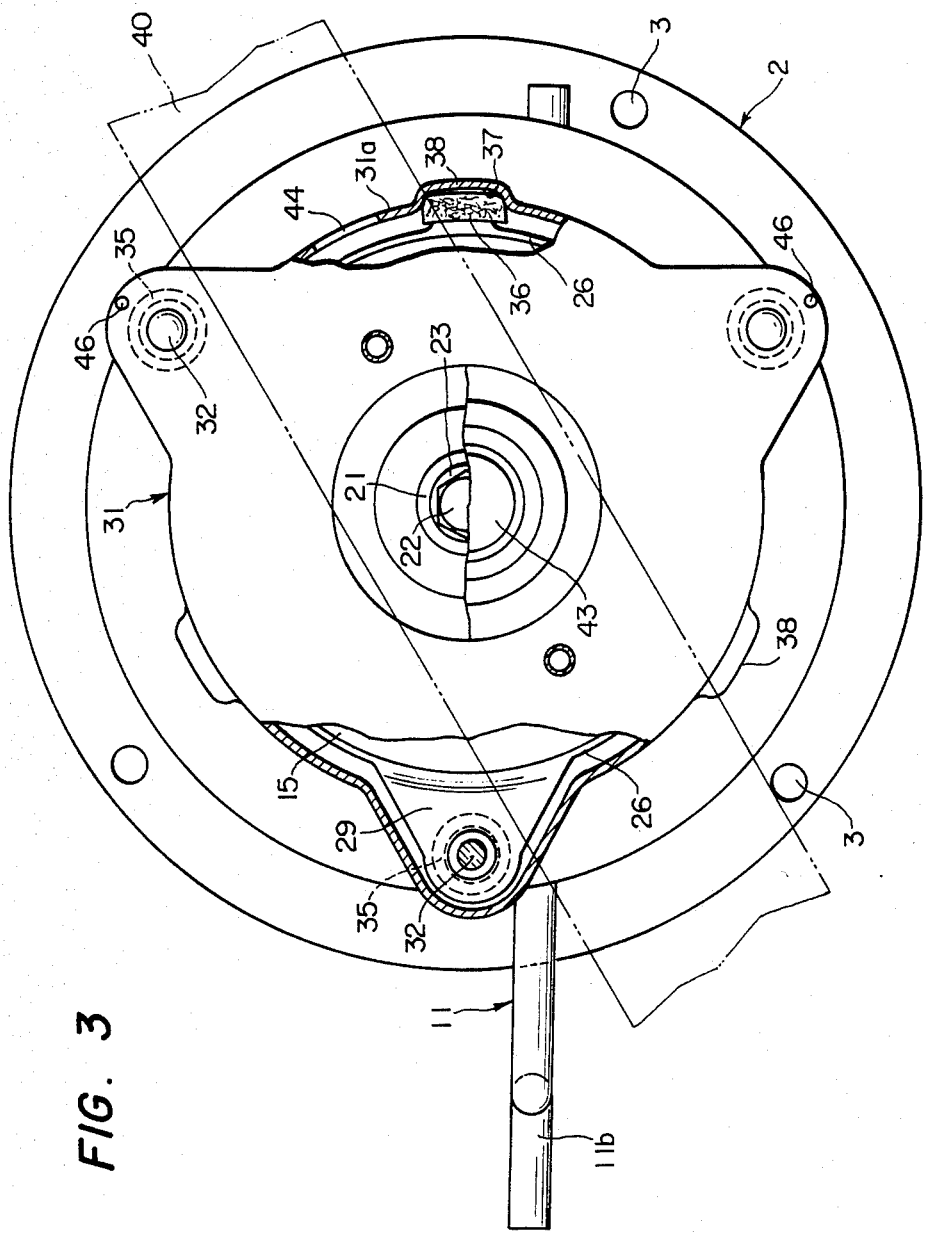
Figure 4:
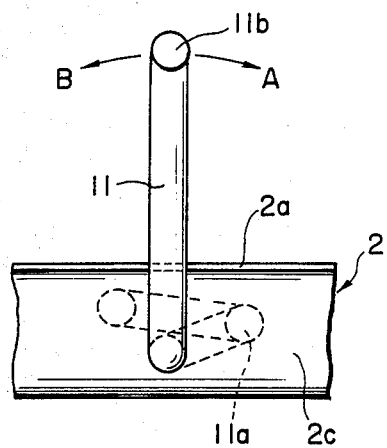
Figure 5:
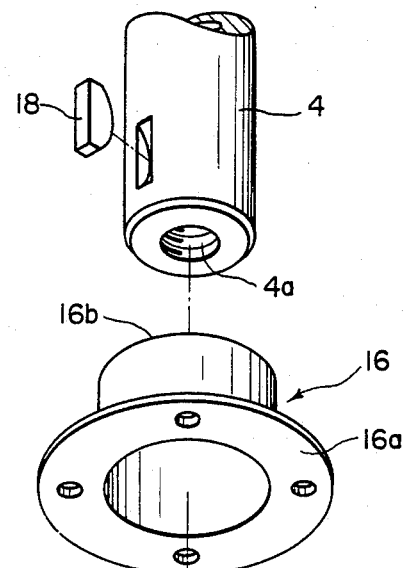

To allow rotation of the cutting tool 40, a push is given to a cable (not shown) coupled to the operation rod 11 to turn it in the direction indicated by an arrow A in FIGS. 2 and 4. The bent portions 11a and 11a of the operation rod 11 urge the members 12 downwardly in FIG. 1, so that the pressure spring 9 is contracted. The pressure plate 6 is then guided downward by the guide pin 5 in parallel manner with attendant expansion of the clutch spring 35. Subsequently, the clutch plate 27 moves down following the pressure plate 6 while it remains engaged by the retainer 24 and the thrust bearing 28. The lining 27a of the clutch plate 26 first separates away from the undersurface of the bottom of the annular recession 2b of the fixed member 2, and then come into contact with the disc plate 15 rotating together with the output shaft 4 through its neutral condition. Upon the lining 27b touching the disc plate 15, the clutch plate follows the rotation of the disc plate 15, and starts to turn while sliding, reaching a semiclutching state. Just then the clutch plate 26 starts to turn smoothly since it is in engagement with the retainer 24 through the thrust bearing 28, so that a load applied on the output shaft 4 rotating the disc plate 15 is alleviated.

Further contraction of the pressure spring 9 causes expansion of the clutch spring 35 with the result that the lining 27b is urged upon the disc plate 15. This attends an increase in the rotational force of the clutch plate 26. When the pressure plate 6 further descends, the thrust bearing 28 mounted on the retainer 24 disengages from the clutch plate 26, whereby a gap is formed therebetween. A force exerted by the pressure spring 9 to thrust up the clutch plate 26 is substantially eliminated with removal of a braking force of the clutch plate 26. A clutching force is then produced to rotate the clutch plate 26 together with the disc plate 15 for engagement of the clutch. Consequently, the power of the output shaft 4 is transmitted to the rotating member 31 via the collar member 13, the disc plate 15, the clutch plate 26, the projection 36 and the guide member 37 to rotate the cutting tool 40.

Upon release of the cable, the pressure plate 6 is forced up in FIG. 1 by the pressure spring 9, and the operation rod 11 is turned in the direction indicated by an arrow B in FIG. 4 to force up the retainer 24. In this way, the gap between the thrust bearing 28 and the clutch plate 26 is eliminated so that the thrust bearing 28 takes abutment upon the clutch plate 26 which is, in turn, pulled up. This attends contraction of the clutch spring 35 which then permits the lining 27b to be spaced away from the disc plate 15 and provide disengagement of the clutch plate 26 and the disc plate 15. The lining 27a reaches a neutral condition, and is urged upon the undersurface of the bottom of the annular recession 2b of the fixed member 2, whereby the rotation of the member 31 is restrained to stop the rotation of the cutting tool 40.

Another embodiment of the present invention applied to a power-operated lawn mower will now be explained with reference to FIGS. 12 to 18.

A fixed member 102 is formed by pressing, and provided at its peripheral edge with three outwardly projecting flanges 102a at regular intervals. The member 102 is tightly fixed to an engine mounting 101 by passing clamping bolts 151 through openings 103 formed in the flanges 102a via sleeves 152 fitted over the shanks 151a thereof.

A cover 153 has its outer peripheral edge 153a attached closely to the inside of the side wall 102c of the fixed member 102 and its outer peripheral edge 153b attached closely to a dust seal 154 which is disposed in a non-rotating member located near the output shaft 104, e.g., an edge 101a of an opening in the engine mounting 101 for the output shaft. This cover 153 is screwed onto a guide pin 105 by means of a screw 155. More specifically, the cover 153 is provided such that a clearance $C_1$ is present between its upper surface and the undersurface of the engine mounting 101, and a clearance $C_2$ is present between its upper surface and the lower portion of the edge 101a. Accordingly, the cover 153 does not interfere with the engine mounting 101, even if there is a difference in the overhang of the engine mounting for each machinery. Further, even when foreign matters such as pieces of grass, mud and sand enter into a space A between the engine mounting 101 and the fixed member 2, this cover prevents them from invading the interior of the arrangement.

Since the fixed member 102 is tightly fixed to the engine mounting 101 via the sleeves 52 through which the clamp bolts 151 pass, it can be secured to the engine mounting 101 without interfering therewith. In addition, the cover 153 is prevented from interfering with the overhang portion of the engine mounting 101 only by varying the length of the sleeves 152, even if there is a difference in the overhang of the engine mounting 101 for each machinery. Therefore, the cover can be attached to various vehicles only by varying the sleeve 152 without replacement of the fixed member 102. Thus, a common part can be used as the cover. Further, due to the presence of the sleeve 152, it is unnecessary to mount the flange 102a for fixing the member 102 on the overall periphery. Namely, the flange may be disposed only in the vicinity of the sleeve with substantial reductions in the weight of the overall arrangement. In particular, this makes the operation of a manual lawn mower easier. In operation, even when foreign matters such as pieces of grass, mud, sand and the like enter between the engine mounting 101 and the fixed member 102 above the arrangement, they are prevented from invading the arrangement since the outer and inner peripheral edges 153a and 153b of the cover 153 are brought into close contact with the inner wall of the fixed member 102 and the non-rotating member in the vicinity of the output shaft, respectively, and the cover 153 is fixedly screwed onto the guide pin 105. Accordingly, inconveniences such as disturbed operation of various working parts due to these foreign matters are not caused at all, thus leading to smooth and sure engagement and disengagement of the clutch. It is also possible to avoid the generation of rust owing to deposition of such foreign matters on various working parts in the arrangement.

This assures stable and satisfactory operation of the arrangement for a long period of time.

An opening 156 is bored in the side wall 102c of the fixed member 102 for inserting the operation rod 11 therethrough, and has a diameter larger than that of the rod. A collar-like reinforcing member 157 is fitted into the opening 156, and fixed in place while the side wall 102c is sandwiched between a stopper 158 formed on the shank 157a and the flange 157b. This reinforcing member 157 receives rotatably the operation rod 111 passing through the fixed member 102. Assembling of this operation rod 111 is effected as follows:

The reinforcing member 157 is first fitted over an arm 111b of the rod, and the right-hand end thereof is inserted from the outside into the opening 156. The bent portions 111a and 111a are engaged with the urging members 112 and 112 fixed to the pressure plate 106, and the reinforcing member 157 is fitted into the opening 156 and fixedly supported by the stopper 158. In this way, the operation rod 111 including the bent portions urging the pressure plate 106 is easily inserted through the opening 156 for assembly thereof. The reinforcing member 157 is easily and surely secured to the fixed member 102 by the stopper 158, and provides an increased contact area for the rotation of the operation rod 111, thus assuring smooth and positive turning of the rod 111. In addition, even when the operation rod 111 is urged towards fixed member 102, the operation rod 111 is not harmed due to the presence of the reinforcing member 157, thus providing longer service life to the rod 111 and assuring sure and stable urging operation of the pressure plate 106 over an extended period.

A washer 159 has its peripheral edge 159a in engagement with the inner peripheral edge 131b of the rotating member 131, and is mounted in place by a bolt 122, urging the lower portion of the bearing 120. This results in prevention of downward disengagement of the collar member 113 and bearing 120. This washer 159 also serves to prevent foreign matters such as mud, sand, pieces of grass and the like from entering the bearing 120.

A bearing cover 160 includes a flange 160a having blades 160b arranged equidistantly and projecting outwardly, and is fixed to the collar member 113, together with the disc plate 115, by inserting a rivet 117 through its opening 160c. The flange 160a covers the outer periphery of the bearing 120 from its upper end. The bearing cover 160 rotates integrally with the disc plate 115 following the rotation of the output shaft 104, and generates wind by the blades 160b to blow off mud, sand, pieces of grass and the like coming in the arrangement during operation, thus preventing invasion by such matter.

It will be noted that the bearing cover 160 may be mounted directly on the disc plate 160 or other parts.

Consequently, it is possible to prevent unsatisfactory turning or non-operation of the bearing 120 owing to foreign matters such as mud, sand or pieces of grass, or overloading of the engine. Thus, the bearing 120 can be well used over over a long period of time without suffering damage.

An antifriction bearing 161 formed of a synthetic resin material such as Teflon (registered trademark for fluorocarbon polymer by E. I. DuPont de Nemours and Co.) is bonded to an annular groove 124b formed in the flange portion 124a of a retainer 124 with the application of an adhesive. This antifriction bearing 161 may be fixed to either the retainer 124 or the clutch plate 126 with the use of an adhesive having a bonding force stronger than the torque produced during engagement of the clutch. In this case, provision of the annular groove 124b is of course eliminated.

This leads to a reduction in the amount of rotational force of the clutch plate 126 that is transmitted to the fixed side of the pressure plate 106 during engagement and disengagement of the clutch, resulting in marked reductions in the load applied to the engine. Consequently, the engine operates smoothly without interruption. During operation, the antifriction bearing considerably alleviates the collision of the clutch plate 26 therewith, without damaging the clutch plate 126. A noise generated by sliding movement of the bearing relative to the clutch plate 126 is also limited to a considerable extent. In addition, the antifriction bearing 161 gives rise to little or no impact, water invasion or shortness of oil, thus assuring longer service life, and stable and satisfactory operation over an extended period. As mentioned above, the antifriction bearing 161 can easily and readily fixed in place with the use of an adhesive.

Cup like spring stoppers 162, 163 are provided, confronting a support pin 132 and a support portion for the clutch plate 126. The spring stopper 162 is kept by a snap ring 164 fixed to the end of the pin 132, while the spring stopper 163 includes a pin seal 165 coupled integrally to the base thereof, which is tightly inserted in between the inner periphery of an opening 130 and the outer periphery of the pin 132. The spring stopper 163 is coupled integrally to the pin seal 165 for permitting easy fitting thereof. A clutch spring 135 is biased between the spring stoppers 162 and 163 to constantly bias the clutch plate 126 toward the disc plate 115 under the spring force.

A dust boot 166 has one end 166a locked to the outside of the spring stopper 162 and the other end locked to the outside of the spring stopper 163, and includes a shank 166c covering the clutch spring 135. This dust boot is disposed such that even when the clutch spring 135 contracts, it does not disengage out of the spring stoppers 162 and 163. In an alternative embodiment, the dust boot 166 may be fixed at both ends 166a and 166b to the spring stoppers 162 and 163 by clips.

With this arrangement, it is possible to assuredly prevent deposition and/or accumulation of foreign matters such as pieces of grass, mud, small stones and so on within the clutch spring 135 or in the vicinity thereof, even if they enter the arrangement during operation. Thus, smooth and sure engagement and disengagement of the clutch is assured without giving rise to any inconveniences. It is also possible to avoid generation of rust due to deposition of pieces of grass, mud, sand and the like. Therefore, the clutch spring can be used stably and satisfactorily without suffering damage over an extended period of time.

An opening 167 is defined between the dust boot 166 and the peripheral edge of the free end of a projection 131c formed in the rotating member 131, and serves to discharge foreign matters such as pieces of grass to the outside, said matters entering the rotating member 102 and being built up in the projection 131c by centrifugal force, and prevent them from being deposited on the inside corner of the free end of the projection 131c so as to avoid inoperativeness caused by contact of the plate 126 with pieces of grass during engagement of the clutch.

Accordingly, even when foreign matters such as pieces of grass, mud, sand the like enter the rotating member 131 during operation it is possible to gather them in the projection by centrifugal force, and discharge them to the outside through the opening 167 without deposition and accumulation thereof in the inside corner of the projection 131c. This assures that the clutch plate 126 permits smooth and stable engagement and disengagement of the clutch without any failure, which may otherwise be caused by contact of the clutch plate 126 to the accumulated and deposited pieces of grass, mud, sand and the like. Entrance of pieces of grass etc. through the opening 167 is avoided by a blast of wind produced by rotation of a cutting tool and the like. In addition, even when pieces of grass and the like enters into the rotating member 131 through other portions, and are not discharged through the opening 167 by centrifugal force, they can easily be removed from the outside.

What is claimed is:

1. A clutch brake apparatus, comprising:
   a fixed member secured to an engine mounting;
   an engine output shaft projecting from the fixed member;
   a rotating member rotatably mounted on the output shaft;
   a pressure plate mounted on said fixed member and movable in a direction parallel to the output shaft;
   a pressure spring between the pressure plate and the fixed member;
   an operation rod adjacent said pressure plate, upon which said pressure plate is urged by said pressure spring, for moving said pressure plate against the force of said pressure spring;
   a disc plate integrally rotatable with said output shaft, opposite said fixed member with respect to said pressure plate;
   a clutch plate between the disc plate and the fixed member, having inner and outer peripheries, movable in the direction parallel to the output shaft, rotatable with said rotating member;
   means for urging said clutch plate toward said fixed member;
   a clutch spring for urging the clutch plate toward the disc plate; and
   means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said clutch spring.

2. A clutch brake apparatus, comprising:
   a fixed member secured to an engine mounting;
   an engine output shaft projecting from the fixed member;
   a rotating member rotatably mounted on the output shaft;
   a pressure plate mounted on said fixed member and movable in a direction parallel to the output shaft;
   a pressure spring between the pressure plate and the fixed member;
   a plurality of guide pins mounted on said fixed member for said pressure plate, extending parallel to said output shaft, slidably mounted with respect to said pressure plate;
   an operation rod adjacent said pressure plate, upon which said pressure plate is urged by said pressure spring, extending substantially diametrically with respect to said pressure plate, provided with bent portions on both sides of the output shaft so that said pressure plate is moved by the bent portions upon rotation of the operation rod;
   a disc plate integrally rotatable with said output shaft, opposite said fixed member with respect to the pressure plate;
   a clutch plate between the disc plate and the fixed member, having inner and outer peripheries, movable in the direction parallel to the output shaft, rotatable with said rotating member;
   means for urging said clutch plate toward said fixed member;
   a clutch spring for urging the clutch plate towards the disc plate;
   means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said clutch spring.

3. A clutch brake as claimed in claim 2, in which said pressure plate is provided with a stopper bolt with its end confronting said fixed member, said bolt being regulated with respect to the amount of threaded extension so as to restrict the movement of the pressure plate.

4. A clutch brake arrangement as claimed in claim 2, in which said stopper bolt is located in a position extending at a right angle with said operation rod.

5. A clutch brake as claimed in claim 3, in which a pair of said stopper bolts are disposed on both sides of said operation rod.

6. A clutch brake claimed in claim 2, in which said fixed member is provided with an opening for accepting the operation rod, said opening having a diameter larger than that of said rod, and said opening is provided with a reinforcing member provided with a stopper member, said stopper member being in engagement with said fixed member.

7. A clutch brake apparatus, comprising:
   a fixed member secured to an engine mounting;
   an engine output shaft projecting from the fixed member;
   a rotating member rotatably mounted on the output shaft;
   a pressure plate mounted on said fixed member and movable in a direction parallel to the output shaft;
   a pressure spring between the pressure plate and the fixed member;
   an operation rod adjacent said pressure plate, upon which said pressure plate is urged by said pressure spring;

a disc plate integrally rotatable with said output shaft, opposite said fixed member with respect to the pressure plate;

a clutch plate between the disc plate and the fixed member, having inner and outer peripheries movable in the direction parallel to the output shaft, rotatable with said rotating member;

means for urging said clutch plate toward said fixed member;

a clutch spring for urging the clutch plate toward the disc plate;

means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said clutch spring, said means for engaging comprising a bearing between said clutch plate and said pressure plate so that rotational force from said clutch plate is not transmitted to said pressure plate.

8. A clutch brake as claimed in claim 7, in which said bearing has a tongue piece supportably engaged with the peripheral edge of one of said clutch plate and said pressure plate.

9. A clutch brake as claimed in claim 7, in which said bearing is an antifriction bearing of synthetic resin.

10. A clutch brake apparatus, comprising:
a fixed member secured to an engine mounting;
an engine output shaft projecting from the fixed member;
a rotating member rotatably mounted on the output shaft;
a pressure plate mounted on said fixed member and movable in a direction parallel to the output shaft;
a pressure spring between the pressure plate and the fixed member;
an operation rod adjacent said pressure plate, upon which said pressure plate is urged by said pressure spring;
a disc plate integrally rotatable with said output shaft, opposite said fixed member with respect to the pressure plate;
a clutch plate between the disc plate and the fixed member, having inner and outer peripheries, movable in the direction parallel to the output shaft, rotatable with said rotating member;
means for urging said clutch plate toward said fixed member;
a support pin engaged with said rotating member and extending with clearance through an opening in said clutch plate;
a spring stopper engaged near the end of said support pin;
a clutch spring between said spring stopper and said clutch plate for biasing the clutch plate toward the disc plate; and
means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said clutch spring.

11. A clutch brake as claimed in claim 10, further comprising a plurality of pressure springs biasedly interposed between said pressure plate and said fixed member, and a plurality of clutch springs interposed between said clutch plate and rotating member for biasing said clutch plate toward said disc plate, said pressure springs having a resultant spring force greater than that of said clutch springs even when one of said clutch springs breaks or disengages.

12. A clutch brake as claimed in claim 10 or 11, in which said pressure plate and clutch plate have a preset equal spring force, and said pressure springs are larger than said clutch springs by at least two.

13. A clutch brake as claimed in claim 10, further including spring stoppers provided in such a manner that they face said support pin and clutch plate, a clutch spring biasedly interposed between said stoppers, and a dust cover covering said clutch spring.

14. A clutch brake apparatus, comprising:
a fixed member secured to an engine mounting;
an engine output shaft projecting from the fixed member;
a rotating member rotatably mounted on the output shaft;
a pressure plate mounted on said fixed member and movable in a direction parallel to the output shaft;
a pressure spring between the pressure plate and the fixed member;
an operation rod adjacent said pressure plate, upon which said pressure plate is urged by said pressure spring;
a disc plate integrally rotatable with said output shaft, opposite said fixed member with respect to the pressure plate;
a clutch plate between the disc plate and the fixed member, having inner and outer peripheries, movable in the direction parallel to the output shaft;
a guide member on the outer periphery of said clutch plate, engaging said rotating member in a recession-projection relation so that said clutch plate is rotatable integrally with respect to said rotating member;
means for urging said clutch plate toward said fixed member;
a clutch spring for urging the clutch plate toward the disc plate;
means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said clutch spring.

15. A clutch brake as claimed in claim 14, in which a clearance is provided between an end face of said guide member in said recession-projection fitting and the portion of said rotating member which is opposite thereto.

16. A clutch brake as claimed in claim 14, in which an end face of said guide member is formed into an arcuate shape, and is brought into contact with said recession-projection fitting portion of said rotating member.

17. A clutch brake as claimed in claim 14, in which said guide member is formed of hard resin or rubber.

18. A clutch brake apparatus, comprising:
a fixed member secured to an engine mounting;
an engine output shaft projecting from the fixed member;
a rotating member rotatably mounted on the output shaft;
a pressure plate mounted on said fixed member and movable in a direction parallel to the output shaft;

a pressure spring between the pressure plate and the fixed member;

an operation rod adjacent said pressure plate, upon which said pressure plate is urged by said pressure spring;

a disc plate engaged with said output shaft by a key fitting to be integrally rotatable with said output shaft, opposite said fixed member with respect to the pressure plate;

an adjusting bolt inserted into the disc plate and having an end abutting the end of said output shaft for adjusting the position of the disc plate by rotation of the adjusting bolt;

a clutch plate between the disc plate and the fixed member, having inner and outer peripheries, movable in the direction parallel to the output shaft;

means for urging said clutch plate toward said fixed member;

a clutch spring for urging the clutch plate toward the disc plate;

means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said clutch spring.

19. A clutch brake as claimed in claim 18, in which said clutch plate is provided with linings on opposite faces thereof and said rotating member is provided therein with a sight opening in a position to allow viewing of both linings of said clutch plate.

20. A clutch brake as claimed in claim 19, in which said sight opening has a transparent window.

21. A clutch brake apparatus, comprising:
a fixed member secured to an engine mounting;
an engine output shaft projecting from the fixed member;
a dish-like rotating member mounted on said output shaft through a bearing;
a pressure plate mounted on said fixed member and movable in a direction parallel to the output shaft;
a pressure spring between the pressure plate and the fixed member;
an opertion rod adjacent said pressure plate, upon which said pressure plate is urged by said pressure spring;
a cylindrical collar member disposed around said output shaft and comprising a flange extending from the middle portion of the collar and a plurality of axial, slit grooves extending from one end of the collar member;
a cylindrical key stopper fixed around said collar member and comprising a flange;
a disc plate sandwiched between the flange of the key stopper and the flange of the collar member to convert the slit grooves to key grooves, said collar member being key-engaged to the output shaft while at least one key groove remains unobstructed, said disc plate being opposite said fixed member with respect to the pressure plate;
a clutch plate between the disc plate and the fixed member, having inner and outer peripheries, movable in the direction parallel to the output shaft;

means for urging said clutch plate toward said fixed member;

a clutch spring for urging the clutch plate toward the disc plate;

means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said clutch spring.

22. A clutch brake as claimed in claim 21 in which the end of said key stopper is formed into a trumpet shape.

23. A clutch brake as claimed in claim 21 wherein, in which a bearing cover having a flange for covering said bearing is fixed to said disc plate, said flange being formed integrally with blades.

24. A clutch brake as claimed in claim 21 wherein an opening is formed around the peripheral edge of the projection of said dish-like rotating member.

25. A clutch brake as claimed in claim 21, in which a water discharge through-hole is provided in a position of the lowest portion of said fixed member which is spaced away from the surface thereof abutting upon the clutch plate.

26. A clutch brake apparatus, comprising:
a fixed member tightly secured to an engine mounting;
a sleeve member interposed between said fixed member and said mounting;
a clamp bolt extending through said sleeve;
an engine output shaft projecting from the fixed member;
a rotating member rotatably mounted on the output shaft;
a pressure plate mounted on said fixed member through a guide pin, said pressure plate being movable in a direction parallel to the output shaft;
a pressure spring between the pressure plate and the fixed member;
an operation rod adjacent said pressure plate, upon which said pressure plate is urged by said pressure spring;
a disc plate integrally rotatable with said output shaft, opposite said fixed member with respect to the pressure plate;
a clutch plate between the disc plate and the fixed member, having inner and outer peripheries, movable in the direction parallel to the output shaft;
means for urging said clutch plate toward said fixed member
a clutch spring for urging the clutch plate toward the disc plate;
means for engaging the inner periphery of said clutch plate with said pressure plate while allowing relative rotation therebetween, so that, when said pressure plate is moved against the force of said pressure spring by said operation rod, said clutch plate is separated from said fixed member and is urged upon said disc plate by said cluch spring.

27. A clutch brake as claimed in claim 26, in which a cover has outer and inner peripheral edges which are brought in close contact with the inner wall of said fixed member and a non-rotating member in the vicinity of the output shaft, and is screwed onto said guide pin.

* * * * *